June 23, 1931. O. E. SORDS 1,811,284
TIRE CASING SPREADING MACHINE
Filed Jan. 12, 1927 2 Sheets-Sheet 2
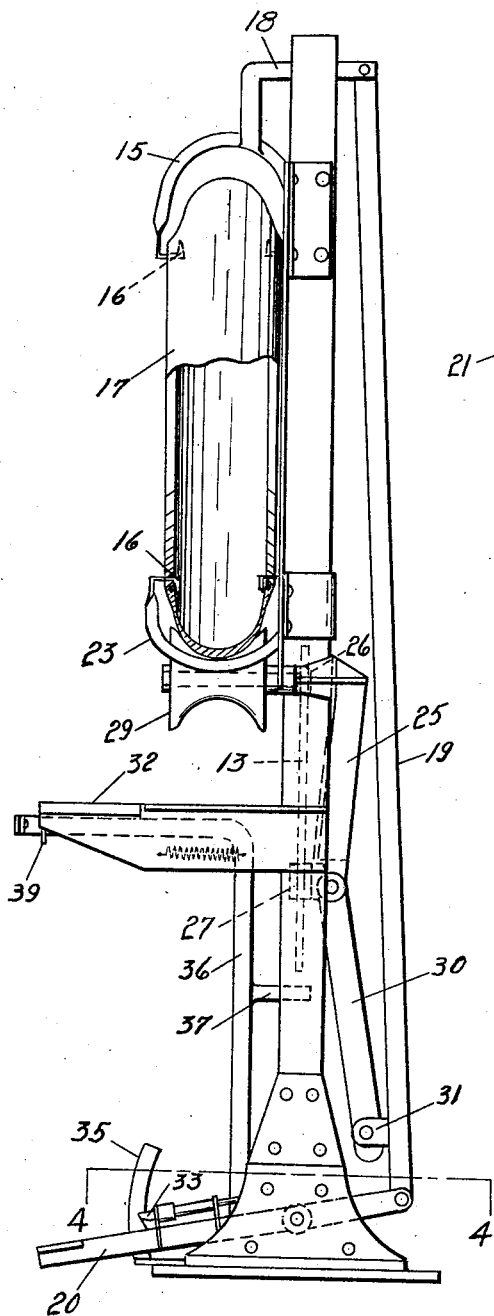
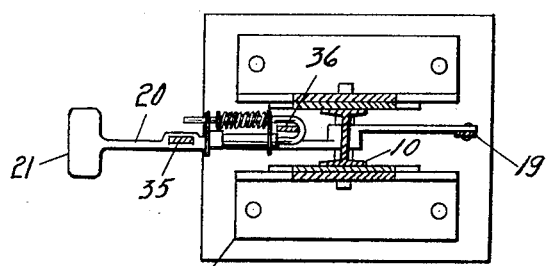
FIG. 4
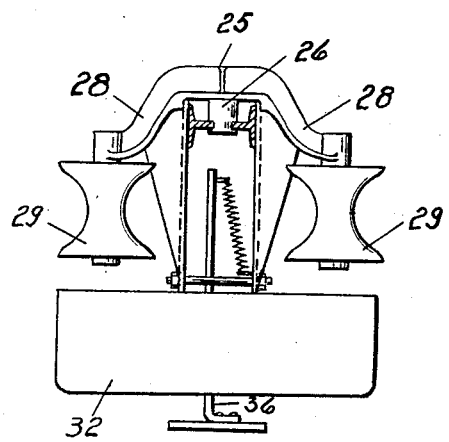
FIG. 5
FIG. 3
INVENTOR.
OTTO E. SORDS.
BY Ely & Barrow
ATTORNEYS.

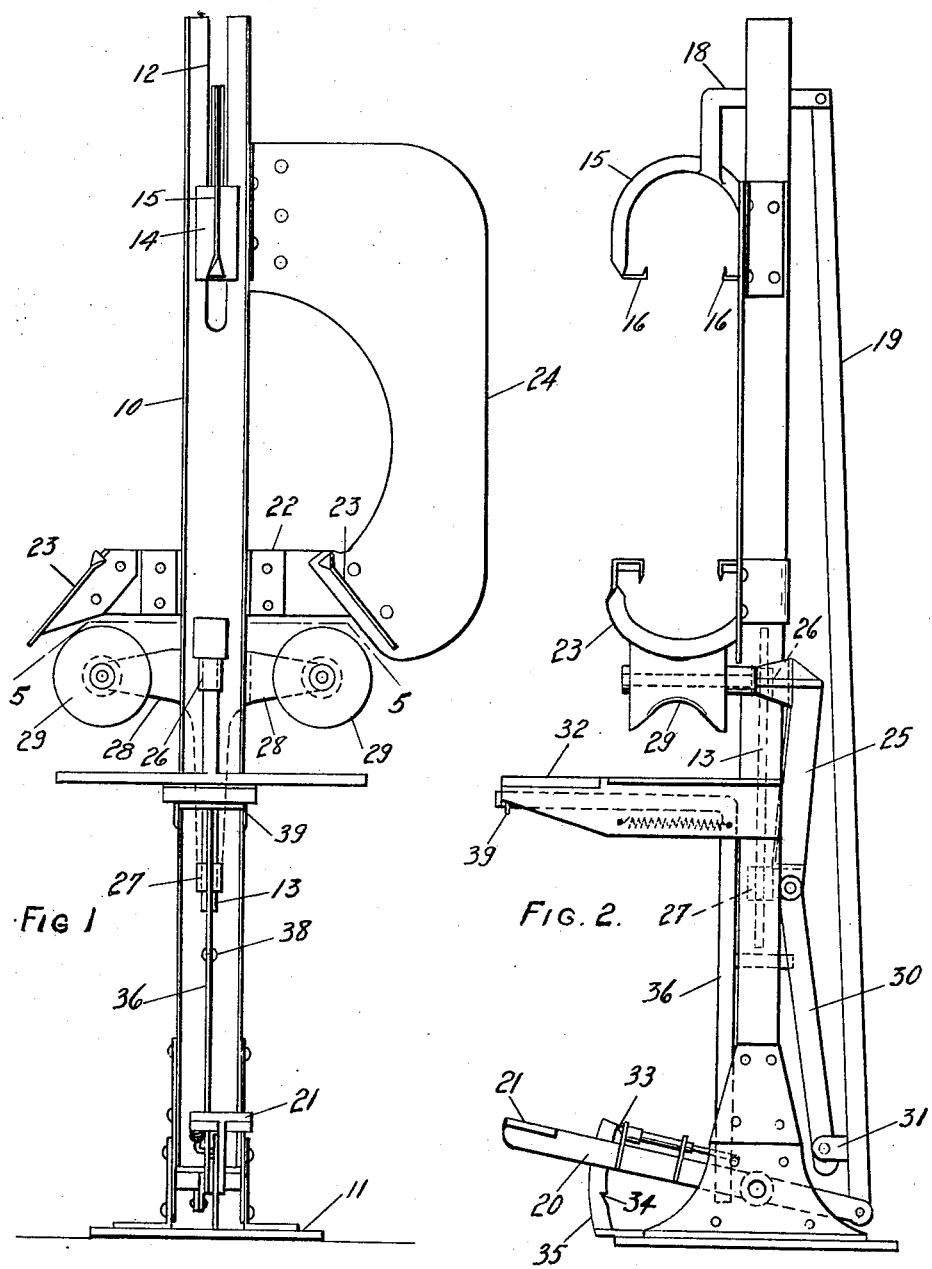

Patented June 23, 1931

1,811,284

UNITED STATES PATENT OFFICE

OTTO E. SORDS, OF CUYAHOGA FALLS, OHIO, ASSIGNOR TO THE FIRESTONE TIRE AND RUBBER COMPANY, OF AKRON, OHIO, A CORPORATION OF OHIO

TIRE CASING SPREADING MACHINE

Application filed January 12, 1927. Serial No. 160,666.

This invention relates to tire casing spreading machines such as used in opening unvulcanized tire casings prior to the insertion of an air bag therein.

An object of the invention is to provide a device which will spread apart the beads and side walls of a tire casing around the entire circumference thereof to facilitate the insertion therein of an air bag or inner tube, or to permit an interior inspection of the casing. Another object is to provide latch means for locking the machine parts in their casing spreading position and means for releasing said latch means.

The foregoing and other objects are obtained by the device illustrated in the accompanying drawings and described below. It is to be understood that the device is not limited to the specific form thereof disclosed herein.

Of the accompanying drawings:

Figure 1 is a front elevation of a machine embodying the principles of the invention;

Figure 2 is a side elevation thereof;

Figure 3 is a side elevation thereof showing the parts in their casing spreading position;

Figure 4 is a plan section taken on the line 4—4 of Figure 3; and

Figure 5 is a sectional detail taken on the line 5—5 of Figure 1.

Referring more particularly to the drawings, 10 represents a standard or frame attached to a base 11, standard 10 preferably being formed of an I-beam section and having upper and lower elongated slots 12 and 13, respectively, in the web portion thereof. A reciprocable slide 14 is mounted in the upper slot and carries U-shaped member 15 having hook portions 16, 16 for engaging the beads of a tire casing 17 at the upper portion of the inner periphery thereof. Integral with member 15 is a rigid arm 18 hingedly connected to a push-rod 19, which is in turn hinged to a pivoted pedal lever 20 carrying a pedal 21, so that when the pedal is pushed down, member 15 will be raised. A cross-arm 22, fixed to standard 10, carries a pair of spaced apart U-shaped members 23, 23 similar to member 15, and having similar hook portions 16, 16. The members 23, 23 however, remain stationary with respect to standard 10. A vertical plate 24 attached to cross-arm 22 and to standard 10, serves as a table against which to support the casing, while air bag is being inserted therein, as will later be more fully described. A member 25 is reciprocably mounted on standard 10 by slide extensions 26 and 27 passing through lower slot 13, and has sidewardly extending arms 28, 28 upon which are mounted concave rollers 29, 29 for supporting the tire casing. The rollers are raised and lowered in unison with member 15 by means of a link 30 connecting member 25 to a lug 31 on push-rod 19. A forwardly projecting shelf 32 is fixed to standard 10 at a point below rollers 29 and serves as a table upon which to rest an air bag while it is being folded preparatory to its insertion into the casing. In order to latch lever 20 in its lowermost position a spring-pressed latch 33 is provided thereon and is adapted to snap into a recess 34 in arcuate bar 35 attached to base 11, the latch being releasable by a release bar 36 carried under shelf 32 and maintained in alignment by a lug 37 passing through an aperture 38 in standard 10 and by an apertured plate 39 depending from shelf 32.

In operation, a tire casing to be spread is placed into the machine from the side, pedal 21 being in its uppermost position to lower member 15 and rollers 29. Hook portions 16, 16 of each of the U-shaped members are engaged over the beads of the casing and pedal 21 is depressed until latch 33 snaps into recess 34. This latter action simultaneously raises member 15 and rollers 29, 29 member 15 pulling up against the casing to cause the same to spread wide open and roller 29, 29 pushing the casing against the hook portions of members 23, 23 to perform the same operation. The casing is thus spread open widely around its entire circumference and is ready for interior inspection, insertion of an air bag or inner tube or any other operation that is to be performed. When an air bag (not shown) is to be inserted into the casing, the air bag is folded, placed in the casing and then allowed to spring back to its normal annular shape, the fitting of the air bag in the casing being aided by the operator striking the latter with a mallet. During the latter operation, plate 24 serves as a lateral support against which to hammer the casing.

Modifications of the invention may be resorted to without departing from the spirit thereof or the scope of the appended claims.

What is claimed is:

1. A tire casing spreader comprising a plurality of spaced hook members for engaging the beads of a tire casing at points about the inner preiphery thereof, one of said members being reciprocable for drawing a portion of the casing radially outward, the remaining hook members being fixed, reciprocable elements adjacent said fixed hook members for engaging the exterior or tread portion of the casing, means for reciprocating said elements and said reciprocable hook member simultaneously in the same direction to spread the casing, means for latching said last-named means in its casing spreading position, and means for releasing said latching means.

2. A tire casing spreader comprising a plurality of spaced hook members for engaging the beads of a tire casing at points about the inner periphery thereof, one of said members being reciprocable for drawing a portion of the casing radially outward, the remaining hook members being fixed, reciprocable elements adjacent said fixed hook members for engaging the exterior or tread portion of the casing, and means for reciprocating said elements and said reciprocable hook member simultaneously in the same direction to spread the casing.

3. A tire casing spreader comprising a plurality of pairs of spaced hook members for engaging both of the beads of a tire casing at points about the inner periphery thereof, one of said members being reciprocable for drawing a portion of the casing radially outward, the remaining hook members being fixed, reciprocable elements adjacent said fixed hook members for engaging the exterior or tread portion of the casing, and means for reciprocating said elements.

4. A tire casing spreader comprising a plurality of spaced yoke members each provided with a pair of hooks for engaging the two beads of a tire casing at spaced points about the inner periphery thereof, one of said members being radially reciprocable for drawing a portion of the casing radially outward, the remaining members being fixed.

5. A machine for spreading the beads and side walls of a tire casing relatively apart about the entire circumference thereof, comprising an upper reciprocable U-shaped hook member and a plurality of lower fixed similar hook members, said hook members being adapted to span a tire casing and grip the beads thereof, means for actuating said upper hook member for drawing the upper circumferential portion of said beads relatively away from the lower circumferential portions thereof, and reciprocable tread engaging members adjacent the fixed hook members for forcing the tread of the casing radially inward with respect to said fixed hook members.

6. A tire casing spreading machine, comprising a reciprocable hook member and a plurality of fixed hook members, said hook members being adapted to grip a bead of the tire casing, means for forcing said hook members relatively radially outwardly with respect to the axis of the tire casing, and means for spreading the beads and side walls of the tire casing relatively apart about the entire circumference thereof.

7. A device of the class described comprising means for gripping the beads of a tire casing, means for forcing the tread of the casing radially inward adjacent said gripping means, and means for forcing the beads radially outward at a point remote from said gripping means, all of said means cooperating to spread the beads and side walls of the casing relatively apart about their entire circumference.

OTTO E. SORDS.